(12) United States Patent
DeLongchamp et al.

(10) Patent No.: US 7,799,467 B2
(45) Date of Patent: Sep. 21, 2010

(54) SOLID POLYMER ELECTROLYTES FROM ETHYLENE OXIDE-CONTAINING, LAYER-BY-LAYER ASSEMBLED FILMS

(75) Inventors: Dean M. DeLongchamp, Cambridge, MA (US); Paula T. Hammond, Newton, MA (US); Hiroaki Tokuhisa, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 71 days.

(21) Appl. No.: 10/409,670

(22) Filed: Apr. 7, 2003

(65) Prior Publication Data

US 2003/0228523 A1 Dec. 11, 2003

Related U.S. Application Data

(60) Provisional application No. 60/370,855, filed on Apr. 8, 2002.

(51) Int. Cl.
*H01M 6/18* (2006.01)

(52) U.S. Cl. .................... 429/306; 429/30; 429/141; 429/144; 429/231.95; 429/303; 429/324; 429/188

(58) Field of Classification Search ................ 429/323, 429/231.95, 30, 13, 20, 39, 16, 44, 141, 144, 429/303, 306, 324, 188, 404
See application file for complete search history.

(56) References Cited

U.S. PATENT DOCUMENTS

| 5,208,111 | A | * | 5/1993 | Decher et al. ............. 428/420 |
| 5,429,759 | A | | 7/1995 | Andrieu et al. |
| 5,536,573 | A | * | 7/1996 | Rubner et al. ............. 428/378 |
| 2001/0048975 | A1 | * | 12/2001 | Winterton et al. ........ 427/412.1 |

FOREIGN PATENT DOCUMENTS

| JP | 02185525 | 7/1990 |
| JP | 04013760 | 1/1992 |
| WO | WO 99/35520 | 7/1999 |
| WO | WO 00/53296 | 9/2000 |
| WO | WO 01/57118 | 8/2001 |

OTHER PUBLICATIONS

DeLongchamp, D. and Hammond, P. "Fast Ion Conduction in Layer-By-Layer Polymer Films". Chem. Mater. 2003, 15, 1165-1173.
DeLongchamp, D. and Hammond, P. "Highly Ion Conductive Poly-(ethylene oxide)-Bases Solid Polymer Electrolytes from Hydrogen Bonding Layer-By-Layer Assembly". Langmuir 2004, 20, 5403-5411.
Hammond, Paula T. "Form and Function in Multilayer Assembly: New Applications at the Nanoscale". Adv. Mater. 2004, 16, No. 15, Aug. 4.
Lutkenhaus J. and Hammond, P. "Electrochemically enabled polyelectrolyte multilayer devices: from fuel cells to sensors". Soft Matter, 2007. 3, 804-816.

* cited by examiner

*Primary Examiner*—Patrick Ryan
*Assistant Examiner*—Ben Lewis
(74) *Attorney, Agent, or Firm*—Gauthier & Connors LLP

(57) ABSTRACT

A solid polymer electrolyte produced using a layer-by layer (LBL) assembly process. The solid electrolyte is assembled on a substrate by alternating exposure to dilute solutions of polycation and polyanion or hydrogen-bonding donor and hydrogen-bonding acceptor. Ethylene oxide content is introduced into the LBL film by 1) covalent grafting onto a polyionic species, 2) inclusion of an ethylene oxide (e.g. PEO) polymer as one of the two component species of a LBL assembly, or 3) the addition of ethylene oxide-containing small molecule, oligomer, or polymer to a fully assembled LBL polymer matrix. The prepared films were to be ultrathin SPE films with sound mechanical properties and ion conductivity to meet the needs of current applications, such as batteries, fuels cells, sensors and electrochromic devices.

18 Claims, 2 Drawing Sheets

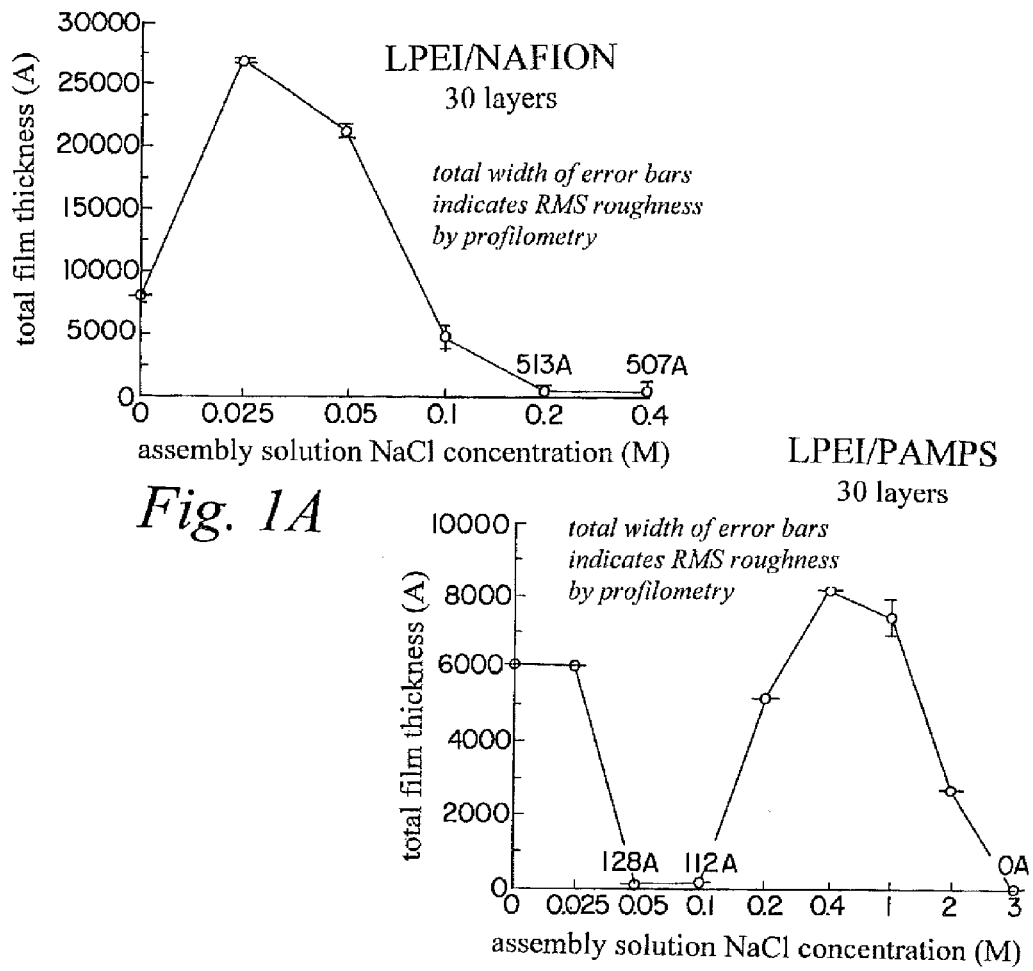
Fig. 1A
Fig. 1B
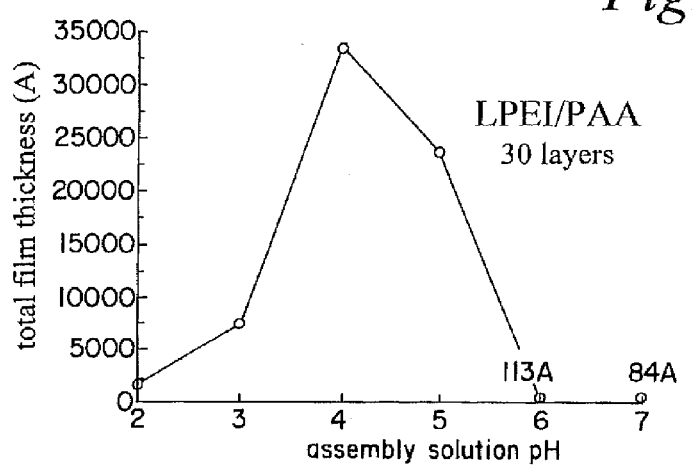
Fig. 1C

SOLID POLYMER ELECTROLYTES FROM ETHYLENE OXIDE-CONTAINING, LAYER-BY-LAYER ASSEMBLED FILMS

PRIORITY INFORMATION

This application claims priority from provisional application Ser. No. 60/370,855 filed Apr. 8, 2002, which is incorporated herein by reference in its entirety.

SPONSORSHIP AMENDMENT

This invention was made with government support under Grant No. DAAD19-99-1-0206, awarded by the Army Research Office. The government has certain rights in the invention.

BACKGROUND OF THE INVENTION

1. Field of the Invention

The invention is directed to a solid electrolyte with ethylene oxide content created using the layer-by-layer assembly process, employing electrostatic, hydrogen-bonding, or other nonspecific interactions.

2. Description of the Prior Art

An ion-conducting medium is required to stoichiometrically balance any electrochemical reaction. Early electrochemistry relied exclusively on liquid electrolytes, but recent applications are more demanding. Solid polymer electrolytes (SPEs) have replaced liquid electrolytes in many high-performance applications such as batteries, including fuel cells, sensors, and electrochromic devices. Compared to liquid electrolytes, SPEs feature easier processing, enhanced chemical compatibility, and better mechanical properties with only a modest conductivity decrease. Research focuses on two SPE types. The first, known as bionic conductors, are polar polymer matrices (e.g. PEO) solvating a lithium salt. The second, known as single-ion conductors, are polyanions from which a small cation dissociates into the polymer matrix. Attempts to improve SPE ion conductivity focus on 1) enhancing ion mobility by increasing matrix plasticity or reducing crystallinity and 2) enhancing ion pair dissociation by increasing matrix polarity.

One method utilized to create materials that has been developed in recent years is the layer-by-layer (LBL) approach pioneered by Decher, G.; Hong, J. D. *Makromolekulare Chemie-Macromolecular Symposia* 1991, 46, 321-327. In the original approach, substrates were alternately exposed to solutions containing polyelectrolytes of opposite charges. The substrate surface charge was reversed upon each exposure, enabling the controllable deposition of polymer complexes as thin films. The electrostatic LBL technique has been extended to include many charged systems other than polymers Ariga, K.; Lvov, Y.; Onda, M.; Ichinose, I.; Kunitake, T. *Chemistry Letters* 1997, 125-126 and even other complexation mechanisms such as hydrogen bonding, Rubner, M. F.; Stockton, W. B. *Macromolecules* 1997, 30, 2717-2725. Film growth modulation has been achieved by changing deposition solution pH or salt content, Decher, G.; Hong, J. D. *Berichte Der Bunsen-Gesellschaft-Physical Chemistry Chemical Physics* 1991, 95, 1430-1434 and Decher, G.; Hong, J. D.; Schmitt, J. *Thin Solid Films* 1992, 210, 831-835.

SUMMARY OF THE INVENTION

A solid polymer electrolyte produced using a layer-by-layer (LBL) assembly process. The solid electrolyte is assembled on a substrate by alternating exposure to dilute solutions of polycation and polyanion or hydrogen-bonding donor and hydrogen-bonding acceptor. Examples of polycation include linear or branched poly(ethylene imine), poly (allylamine hydrochloride), poly(diallyldimethylammonium chloride), or poly(lysine). Examples of polycation include poly(acrylic acid), poly(methacrylic acid), poly(styrene sulfonate), poly(2-acrylamido-2-methyl-1-propane-sulfonic acid), or NAFION® (DuPont). Hydrogen-bonding systems include combinations of poly(ethylene oxide) and the other polycations and polyanions described above deposited at various pH. Ethylene oxide content is introduced into the LBL film by 1) covalent grafting onto a polyionic species, 2) inclusion of an ethylene oxide (e.g. PEO) polymer as one of the two component species of a LBL assembly, or 3) the addition of ethylene oxide-containing small molecule, oligomer, or polymer to a fully assembled LBL polymer matrix.

Using these strategies, LBL assembly was employed to create new single-ion and double-ion conducting polymer systems. Both electrostatic and hydrogen bonding complexation mechanisms were employed. The prepared films were to be ultrathin SPE films with sound mechanical properties and ion conductivity to meet the needs of current applications, such as batteries, fuels cells, sensors and electrochromic devices.

BRIEF DESCRIPTION OF THE DRAWINGS

Other objects, features and advantages of the present invention will become more apparent as the description proceeds with reference to the accompanying drawings, wherein:

FIGS. 1A-C are graphs of total thickness versus assembly solution concentration and pH;

DETAILED DESCRIPTION OF THE INVENTION

Figure 2:
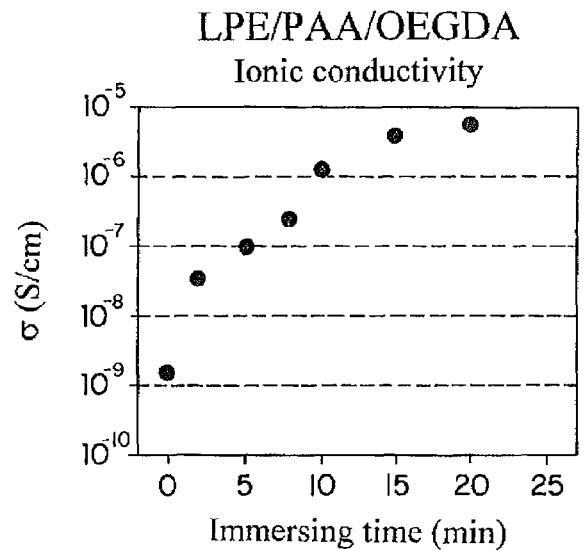
FIG. 2 is a graph of ionic conductivity versus immersing time.

Generally, a solid polymer electrolyte created using the layer-by-layer assembly process, employing electrostatic, hydrogen-bonding, or other nonspecific interactions. These solid electrolyte systems contain significant ethylene glycol or ethylene oxide content, which is added as a part of the constituent polymers or introduced after assembly. Lithium salts can be dissolved in the matrix to enhance ionic conduction. Thermal or chemical crosslinking can be introduced to enhance mechanical stability. The composition of the film can be controlled on a nanometer to micron length scale to vary transport properties. This control can be exerted to introduce gradients or step changes in composition, acidity or basicity, or dielectric constant, for example.

More specifically, the solid electrolyte is assembled on a substrate by alternating exposure to dilute solutions of polycation and polyanion or hydrogen-bonding donor and hydrogen-bonding acceptor. Examples of polycation include linear or branched poly(ethylene imine) (BPEI), poly(allylamine hydrochloride), poly(diallyldimethylammonium chloride), or poly(lysine). Examples of polyanion include poly(acrylic acid), poly(methacrylic acid), poly(styrene sulfonate), poly(2-acrylamido-2-methyl-1-propane-sulfonic acid) (PAMPS), or NAFION (DuPont). Hydrogen-bonding systems include combinations of poly(ethylene oxide) and the other polycations and polyanions described above deposited at various pH.

Ethylene glycol content can be added by grafting to polycations or polyanions using amidation chemistry with readily available amine- or carboxylic acid-terminated poly(ethylene glycols). This method provides a flexible way to manipulate the mechanical properties of the matrix and the ion mobility in the matrix. The result is a solid electrolyte film that can exhibit the conductivity properties of a swollen gel.

The solid electrolyte can be operated as a single-ion conductor; conduction is provided from polyacid protons or other dissociated alkali cations. One example of this mode is demonstrated by the poly(ethylene oxide)/poly(acrylic acid) composite. The solid electrolyte can also be operated as a two-ion conductor by investing the assembled film with a lithium salt such as lithium perchlorate, lithium hexafluorophosphate, or lithium trifluoromethanesulfonate or acid such as phosphonic acid. Small ion salts or acids are added by immersing the substrate into ionic solutions followed by drying without rinsing.

The mechanical strength of the composite can be enhanced by chemical crosslinking provided by heating. In the case of electrostatically assembled films such as poly(acrylic acid)/poly(ethylene imine) composites, the crosslinks are provided by amide bonds as well as anhydride bonds between adjacent carboxylic acid moieties. In hydrogen bonding systems such as poly(ethylene oxide)/poly(acrylic acid) composites, crosslinks are typically of the anhydride type. Without this crucial step, the films are not stable in ionic solution and cannot be loaded with salt.

After assembly, performance of the solid electrolyte may be changed by adding materials such as water, organic carbonates, or other solvent systems to plasticize the polymer matrix and encourage dissociation. Plasticizers could also be ethylene oxide-containing polymers or oligomers with affinity for the host matrix. Other additives that would potentially improve ion conduction are inorganic solid particles such as alumina which could be added in bulk after film formation, could be grown in situ by electroless metal plating and subsequent oxidation, or could be layer-by-layer assembled with the polymers.

Applications include batteries, fuel cells, electrochemical sensors (including biopassivating membranes for electrical sensor protection in vivo), and electrochromic devices. Advantages include processing ease, high quality electrolyte films with few or no defects, and the opportunity to easily tune transport properties of the films by changing layer-by-layer assembly variables such as co-polymer and deposition solution conditions.

Ionic conductivity of $4 10^{-5}$ S/cm has been achieved with hydrated poly(ethylene oxide)/poly(acrylic acid) composites with no added salt. This performance is competitive with polyelectrolyte gels used commercially. General advantages to these materials include processing ease, high quality electrolyte films with few or no defects, and the opportunity to easily tune transport properties of the films by changing layer-by-layer assembly variables such as co-polymer and deposition solution conditions.

There are some outstanding advantages compared to existing materials and techniques including the layer-by-layer process results in ultrathin, pinhole-free films that can be fabricated over large areas. The ability to make defect-free films that are very thin should allow a reduction in allowable solid electrolyte thickness, effectively increasing the conduction of the membrane. This implies that these materials may still be superior to existing materials even if ionic conductivities are equivalent. Additionally, the layer-by-layer process results in inherently amorphous films. Thus, ethylene oxide/glycol-containing films do not crystallize. Crystallization of poly (ethylene oxide) films is the most significant barrier to most applications as it drastically reduces ionic mobility in the matrix. This is the reason that solid electrolytes of this type typically require plasticizer or elevated temperature for acceptable performance. The system may perform well without plasticizer or elevated temperature—a "neat" system that is considered the ultimate achievement in solid electrolyte development.

The ability to pattern these films using non-lithographic techniques such as stamping or printing may result in the creation of systems with side-by-side architecture, such as nanopore- or microchannel-containing films. These techniques could also allow for the formation of microbatteries or micro-fuel cells for small-scale power delivery.

Experimental

Scaffolds assembled by electrostatic LBL assembly can be used in the preparation of ethylene oxide containing LBL solid polymer electrolytes. Examples of these electrostatic scaffolds are systems such as those shown below:

system 1: LPEI/Nafion®

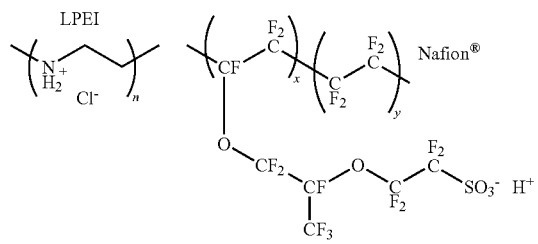

system 2: LPEI/AMPS

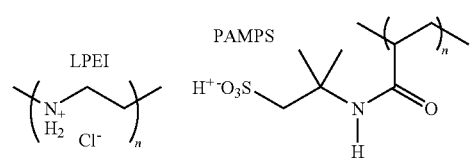

system 3: LPEI/PAA

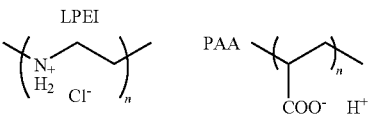

In assembling these electrostatic scaffolds, the polycation LPEI (25,000 $M_w$, Polysciences, Inc.) was used as-received as were polyanions PAA (90,000 $M_w$, Polysciences), PAMPS (Aldrich), and Nafion® 117 (Fluka). The polyelectrolytes were dissolved in MilliQ-filtered deionized water and then pH adjusted with dilute HCl or NaOH solutions. PAMPS solutions were 0.002 M; PAA and LPEI solutions were 0.020 M (polyelectrolyte concentrations are with respect to repeat unit). The Nafion® 117 solution as received from Fluka was 5% polymer solution in light alcohols, (an mixture of isopropyl alcohol, 1-propanol, and methanol in an unspecified ratio), with 1100 Da equivalent weight (MW per sulfonic acid group of Nafion® 117), and unspecified polymer $M_w$. The as-received solution was diluted with MilliQ-filtered deionized water to 0.002 M Nafion® (with respect to the 1100 Da equivalent weight), for a final solvent alcohol composition of 4.4%.

In addition to electrostatic scaffolds, films could be prepared with ethylene oxide content directly by assembling poly(ethylene oxide) (MW 4M, Polysciences, inc.) with polyanions such as polyanions PAA (90,000 $M_w$, Polysciences). For this assembly, the PEO and PAA deposition solutions were at 0.02 M with respect to equivalent weight, and deposition and rinse solutions were kept firmly at pH 2.5. The molecular structures and interaction form for this system are shown below.

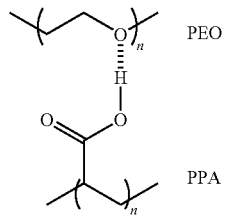

Films could also be prepared by the creation of electrostatic species containing grafted ethylene oxide chains. An example of such a species that was synthesized for this effort is shown below:

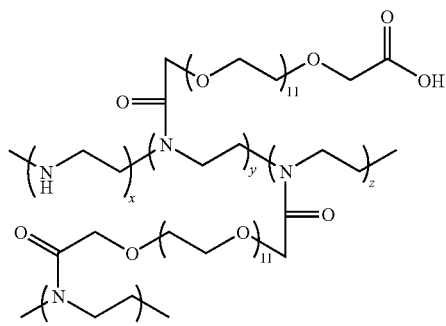

This species, termed LPEI-g-OEGDA was synthesized by amidation. The polycation LPEI (25,000 $M_w$, Polysciences, Inc.) and oligoethylene gycol dicarboxlic acid (600 MW, Fluka) (OEGDA) were dissolved in methanol and boiled for 10 hours. After reaction, the product solution was diafiltered in water against a 3 kDa membrane for 10 equivalent volumes to remove unreacted OEGDA. The resultant LPEI-g-OEGDA was assembled with polyanions such as PAA to create electrostatic LBL assembled films for use as polymer electrolytes.

Substrates for LBL assembly were 1"×2" indium-tin oxide (ITO) coated glass purchased from Donelly Applied Films and patterned by DCI, Inc to form multiple 3 mm ITO stripes. ITO film resistance was measured to be 28/square after patterning. The ITO substrates were cleaned by ultrasonication in a series of solvents including detergent, deionized MilliQ-filtered water, acetone, methanol, and 1,1,1-trichloroethane, for 15 minutes each. Immediately before use, the ITO glass substrates were plasma etched in a Harrick PCD 32G plasma cleaner with oxygen bleed for 5 minutes.

Assembly. Films were constructed using a modified Carl Ziess DS50 programmable slide stainer. Substrates were exposed first to polycation solution for 15 minutes, followed by 4 minutes of rinsing in three MilliQ water baths, then exposed to polyanion solution for 15 minutes, rinsed, and then the cycle was repeated for a nominal number of layer pairs. The same process was used with hydrogen bonding donor/acceptor pairs. Thickness and roughness measurements were performed with a Tencor P10 profilometer using a 2 m stylus and 5 mg stylus force. Following analysis of film assembly, films for ionic conductivity evaluation were fabricated.

Test bed fabrication. After assembly, films for ionic conductivity evaluation were dried at 110° C. for 24 hours, which has been shown to effectively remove water from LBL assembled films.[32] The drying was followed by thermal evaporation through a custom designed shadow mask of 2 mm wide, 1000 Å thick gold electrodes perpendicular to the 3 mm wide patterned ITO stripes. This technique creates 2-electrode test beds of 6 $mm^2$ area in which the LBL film is sandwiched between ITO and gold electrodes. The dimensions allowed 8 such cells per substrate. The cells were profiled to verify the absence of significant gold penetration into the LBL film.

Testing. Following fabrication, the cells were exposed to a controlled humidity environment. First the cells were exposed to a chamber that contained anhydrous $CaSO_4$ (Drierite) the solid-vapor equilibrium of which controls humidity to approximately 17% relative humidity (RH), as measured by a VWR pen thermometer/hygrometer (all RH measurements ±2%) at a room temperature of 25° C. The chamber was approximately 0.05 $m^3$ and contained a fan recirculating at 0.15 $m^3$/min; equilibrium RH at any humidity level was reached within approximately 5 minutes with this configuration. The cells were exposed to this relatively dry environment for 7 days. After this equilibration period, ionic conductivity was evaluated within the chamber by impedance spectroscopy. Substrates were accessed by means of electrodes built into the chamber wall.

Impedance spectroscopy was performed using a Solartron 1260 scanning from 1 MHz to 1 Hz. Due to noise at low frequency and high impedance, the lowest frequency included in analysis was variable and typically greater than 1 Hz; the lowest frequency was chosen so that the measurement would be within the <2% error region of impedance measurement for the instrument. The initial signal amplitude was 10 mV with no bias; amplitude was increased to 100 mV for each sample to reduce noise and increase the effective measurement range. Results at 100 mV amplitude were compared with the earlier 10 mV measurement to ensure no artifacts from increasing amplitude above kT (or approximately 25 mV at 25° C.), which in some cases can cause nonlinearity in the impedance response, especially in the interfacial component.[33] Fitting of the impedance results is described in the Results and Discussion section of this publication. The absence of any cell shorting, even for rough samples, further substantiated that evaporation-deposited gold did not penetrate the LBL film.

Following impedance spectroscopy, the anhydrous calcium sulfate was replaced with a saturated solution of $Mg(NO_2)_2 \cdot 6H_2O$ (Aldrich) in MilliQ water, the vapor-liquid equilibrium of which controls relative humidity to 52% RH at 25° C.[34] After 7 days the ionic conductivity was again evaluated by impedance spectroscopy. Finally, the $Mg(NO_2)_2 \cdot 6H_2O$ solution was replaced with pure MilliQ water for 100% RH at 25° C., with 7-day equilibration and subsequent ionic conductivity evaluation. Following the 100% RH measurement, substrates were immersed in MilliQ water overnight and then evaluated "dripping wet" by impedance spectroscopy using an apparatus that maintained a constant slow drip of MilliQ water over the substrate surface, ensuring that the surface was continuously wetted.

LBL films were invested with salt by soaking the films in aqueous solutions of $LiCF_3SO_3$ overnight and then drying without rinsing. The films were first soaked in a solution of 0.01 M $LiCF_3SO_3$. The two $(LPEI/PAMPS)_{30}$ samples delaminated and could not be tested. Following drying, the films were equilibrated for 7 days at 52% RH and 25° C. and then tested using the procedure described above. The process was repeated for a $LiCF_3SO_3$ concentration of 0.1 M. After the samples were tested at 52% RH, they were exposed to the 100% RH environment and the ionic conductivity was evaluated a final time. $LiCF_3SO_3$ crystallization was not observed on or in the polymer films after drying.

Electrostatic LBL Films as Scaffolds for Introduction of Ethylene Oxide Content

The layer-by-layer (LBL) deposition technique has been applied to the design of polymer scaffold films appropriate for the investment of ethylene glycol-containing molecules for eventual application in sensors and electrochromic cells. We describe three LBL polymer electrolyte systems assembled from cationic layers of linear poly(ethylene imine) (LPEI), with anionic layers of Nafion®, poly(2-acrylamido-2-methyl-1-propanesulfonic acid) (PAMPS), and poly(acrylic acid) (PAA). The assembly behavior of these systems was carefully examined, and ionic conductivity was determined using impedance spectroscopy. The influences of assembly conditions and water plasticization on ion conduction were elaborated (see FIG. 1). Even without the addition of ethylene oxide into the films, room temperature ionic conductivity greater than $10^{-5}$ S/cm can be achieved within LPEI/PAMPS and LPEI/PAA films, which is two orders of magnitude greater than the highest values previously described in LBL films. By manipulating a unique assembly mechanism, high ionic conductivity can be achieved in LPEI/PAMPS films at low plasticizer concentrations. In addition, the addition of lithium triflate salt to fully constructed films increases ionic conductivity at low plasticizer concentrations. The evaluation of performance based on assembly conditions clearly reveals the contributions of different materials and morphologies, suggesting themes for further ionic conductivity improvement.

One of these themes for further ion conductivity improvement is to add significant ethylene oxide content into the LBL assembled polymer film. This was performed for the LPEI/PAA system by adding Oligoethylene glycol dicarboxylic acid (OEGDA). The polyelectrolyte LBL film of linear (LPEI/PAA)/OEGDA composite film was fabricated by immersion of (LPEI/PAA) LBL film into aqueous OEGDA solution. Ionic conductivity of the composite of LBL polyelectrolyte and OEDGA reached up to $10^{-5}$ S/cm at room temperature as can be seen in FIG. 2.

Hydrogen Bonding LBL Films Directly Containing Ethylene Oxide

Hydrogen bonding LBL assemblies containing significant ethylene oxide content can be created by assembling materials such as poly(ethylene oxide) with protonated polyacids such as PAA. Thickness as a function of PEO MW is shown in the table below.

TABLE 1

Influence of PEO MW on the thickness of PEO/PAA assemblies.

| PEO MW | t (Å) | $r_{RMS}$ (Å) |
|---|---|---|
| 1,500 | 839 | >1000 |
| 20,000 | 6486 | 573 |
| 4,000,000 | 7006 | 135 |

As the MW is increased, the thickness of the assembled film increases and the roughness decreases—this effect is due to the inherently low crosslink density associated with hydrogen bonding—bonding is expected for perhaps 10% of all protonated carboxyls and ether oxygens.

Figure 3:
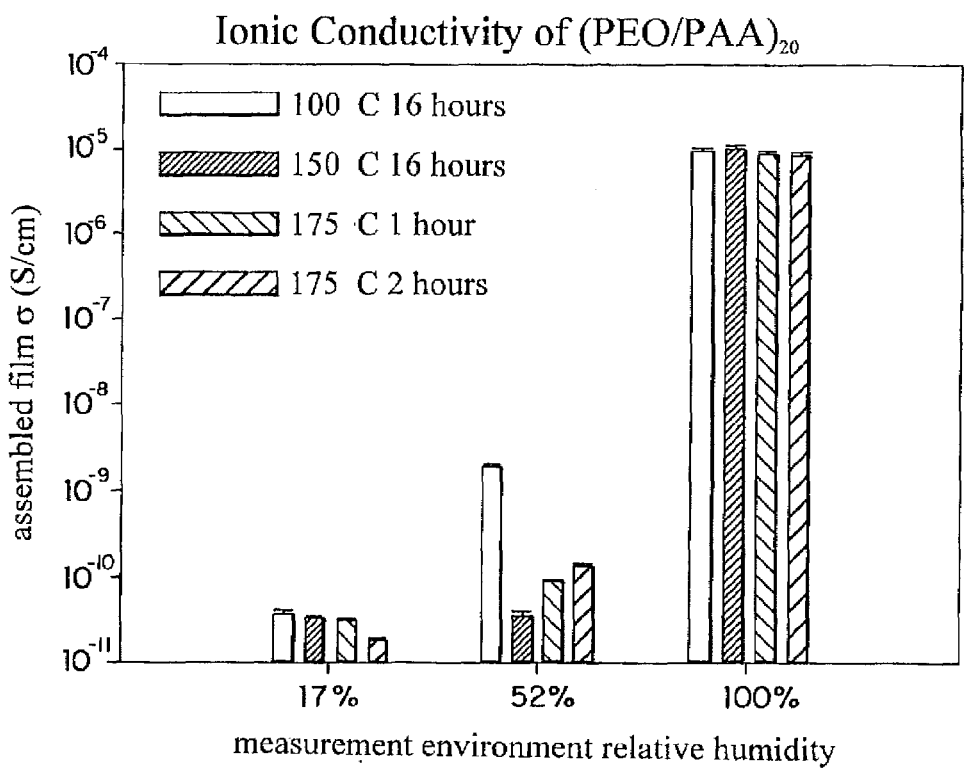
FIG. 3 is a graph of ionic conductivity versus relative humidity.

Films of PEO/PAA were assembled with 20 layer pairs and then exposed to heat to chemically crosslink the films by formation of anhydride linkages between adjacent acrylic acid moieties which would be expected to be dimerized. The ionic conductivity of the resultant films was then evaluated by impedance spectroscopy at several humidity levels. This test reflects plasticization by water hydration. The results are seen on the accompanying FIG. 3. Although the assemblies demonstrate low ionic conductivity at low humidity, conductivity exceeds $10^{-5}$ S/cm with fully hydration, a level that matches that of the OEGDA-plasticized LPEI/PAA films described previously in this document. This level of ionic conductivity is appropriate for electrochemical sensors and electrochromic devices; eventual optimization should render the invention suitable for application in all types of electrochemical devices requiring a solid electrolyte.

The method described herein can be utilized to prepare many new single-ion conducting materials by the LBL technique. The thickness and ionic conductivity of these new materials can be modulated by changing the deposition pH. Changes in thickness and ion conductivity can be explained in terms of increasing protonation of the polyacid with decreasing pH. Increasing protonation leads to lower charge density, thicker films, and a greater number of protons in the final film to act as charge carriers. Film morphology also affects ion mobility.

Although the present invention has been shown and described with respect to several preferred embodiments thereof, various changes, omissions and additions to the form and detail thereof, may be made therein, without departing from the spirit and scope of the invention.

What is claimed is:

1. A method of assembling a thin film solid polymer electrolyte, wherein the electrolyte is ionically conducting while blocking transport of electrons, said method comprises:
   providing a substrate having a top and a bottom;
   exposing the substrate to dilute solutions of a polycation solution to form a coated substrate;
   exposing the coated substrate to dilute solutions of a polyanion;
   repeating the exposing steps to create a layer-by-layer assembly of a predetermined number of layers;
   incorporating ethylene oxide or ethylene glycol in the polycation and/or polyanion while adjusting the pH and ionic strength of polyelectrolyte solutions of polycations mid polyanions so that said assembled film supports mid accommodates the transport of ions through said film.

2. The method of claim 1 wherein the method further includes exposing the film to a lithium salt or protonic acid to achieve dissolution of the salt into the LBL film.

3. The method of claim 2 wherein the lithium salt may be selected from lithium perchlorate, lithium hexafluorophosphate or lithium trifluoromethanesulfonate or acid such as phosphonic acid, sulfuric acid, camphorsulfonic acid, methane sulfonic acid, acetic acid.

4. The method of claim 2 wherein the protonic acid is phosphoric acid, sulfuric acid, camphorsulfonic acid, methane sulfonic acid, acetic acid.

5. The method of claim 1 wherein the polycation is linear or branched poly-ethylene (imine), poly(diallyldimethylammonium chloride), or poly-lysine), chitosan, ethoxylated polyethylene imine.

6. The method of claim 1 wherein the polyanion may be selected from the group consisting of poly(acrylic acid), poly(2-acrylamido-2-methyl-1-propane-sulfonic acid), NAFION, sulfonated poly(styrene), alginic acid, carageenan, poly(methacrylic acid).

7. The method of claim 1 wherein the method further comprises chemically or thermally crosslinking the polymers.

8. The method of claim 1, wherein the film may also include water, organic carbonates, or any other plasticizers.

9. The method of claim 1 wherein said ethylene oxide containing material is oligo ethylene oxide dicarboxylic acid.

10. The method of claim 1 wherein the film is substantially crystalline free.

11. The method of claim 1, wherein the film is dried.

12. The method of claim 1, wherein the polycation and polyanion may be selected from poly(ethylene oxide)/poly(acrylic acid), linear poly(ethylene imine)/oligoethylene glycol dicarboxlic, linear poly(ethylene imine)/poly(acrylic acid), linear poly(ethylene imine)/poly(2-acrylamido-2-methyl-1-propane-sulfonic acid), linear poly(ethylene imine)/poly(acrylic acid)/oligoethylene glycol dicarboxlic, linear poly(ethylene imine)/NAFION®/poly(2-acrylamido-2-methyl-1-propane-sulfonic acid) and linear poly(ethylene imine)/poly(acrylic acid).

13. The method of assembling an ionically conducting film of claim 1, without polyanilines, polythiophenes, polypyrroles or other conjugated polyions.

14. A method of assembling an ionically conducting thin film solid polymer electrolyte; said method comprising providing a substrate having a top and a bottom;
   alternating exposing the substrate to dilute solutions of polycation and polyanion solutions;
   repeating the exposing steps to create a layer-by-layer assembly of a predetermined number of layers; and
   incorporating ethylene oxide or ethylene glycol in the polycation and/or polyanion solutions while adjusting the pH and ionic strength of polyelectrolyte solutions of polycations and polyanions such that said film supports and accommodates the transport of ions and blocks the rapid transport of electrons through said film.

15. The method of claim 14 wherein one of the polymers incorporated is poly(ethylene oxide).

16. The method of claim 14 wherein the polyanion is poly(acrylic acid), poly(methacrylic acid), alginic acid.

17. The method of claim 14, wherein the film is dried.

18. The method of claim 14, wherein the polycation and polyanion may be selected from poly(ethylene oxide)/poly(acrylic acid), linear poly(ethylene imine)/oligoethylene glycol dicarboxlic, linear poly(ethylene imine)/poly(acrylic acid), linear poly(ethylene imine)/poly(2-acrylamido-2-methyl-1-propane-sulfonic acid), linear poly(ethylene imine)/poly(acrylic acid)/oligoethylene glycol dicarboxlic, linear poly(ethylene imine)/NAFION®/poly(2-acrylamido-2-methyl-1-propane-sulfonic acid) and linear poly(ethylene imine)/poly(acrylic acid).

* * * * *